(12) United States Patent
Chen et al.

(10) Patent No.: US 8,201,247 B1
(45) Date of Patent: Jun. 12, 2012

(54) METHOD AND APPARATUS FOR PROVIDING A COMPUTER SECURITY SERVICE VIA INSTANT MESSAGING

(75) Inventors: Shih-Yun Chen, Pingtung (TW); Chun-Chieh Wang, Taipei (TW); Wei-Chin Chen, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 699 days.

(21) Appl. No.: 12/136,990

(22) Filed: Jun. 11, 2008

(51) Int. Cl.
*G06F 11/00* (2006.01)
*G06F 12/14* (2006.01)
*G06F 12/16* (2006.01)
*G06F 23/00* (2006.01)

(52) U.S. Cl. .......................................... 726/22
(58) Field of Classification Search ...................... 726/22
See application file for complete search history.

(56) References Cited

U.S. PATENT DOCUMENTS

| | | |
|---|---|---|
| 2005/0160144 A1 | 7/2005 | Bhatia |
| 2006/0253447 A1* | 11/2006 | Judge ................................ 707/9 |
| 2007/0006026 A1 | 1/2007 | Roychowdhary et al. |
| 2007/0006027 A1 | 1/2007 | Desouza et al. |
| 2007/0006308 A1 | 1/2007 | Desouza et al. |
| 2007/0043823 A1 | 2/2007 | George et al. |
| 2008/0063201 A1 | 3/2008 | Wormald et al. |
| 2008/0084972 A1 | 4/2008 | Burke et al. |

OTHER PUBLICATIONS

Threat Management, Challenges and Solutions: Web Threats, A Trend Micro White Paper, Feb. 2007, 14 pages, Trend Micro Inc., Cupertino, CA, USA.

* cited by examiner

*Primary Examiner* — Kambiz Zand
*Assistant Examiner* — Stephen Sanders
(74) *Attorney, Agent, or Firm* — Okamoto & Benedicto LLP

(57) ABSTRACT

One embodiment relates to a method of providing a computer security service via instant messaging. An instant message is received from an originating user account. The instant message is parsed to identify files and universal resource locators (URLs) in the instant message. If any files are identified, then said identified file(s) are scanned for malicious code to generate scan results. If any URLs are identified, then said identified URL(s) are checked against a ratings database to generate rating results. A responsive instant message to the originating user account is generated, wherein the responsive instant message includes said scan and rating results. Other embodiments, aspects and features are also disclosed.

6 Claims, 10 Drawing Sheets

METHOD AND APPARATUS FOR PROVIDING A COMPUTER SECURITY SERVICE VIA INSTANT MESSAGING

BACKGROUND OF THE INVENTION

1. Field of the Invention

The present invention relates generally to computer systems and more particularly, but not exclusively, to methods and apparatus for providing a computer security service.

2. Description of the Background Art

Computer viruses, worms, Trojans, and spyware are examples of malicious code. Malicious code may, for example, corrupt or delete important files, send e-mails without user authorization, render a computer inoperable, or cause other types of damage to a computer. Malicious code may be communicated between computers, for example, by transferring files that include the code.

Web threats encompass a broad array of threats that originate from web sites on the Internet. For example, a web site may a "phish" site. A "phish" site is a fraudulent site that attempts to trick a user into providing sensitive information, such as credit card information, or user names and passwords. As another example, a web site may be a source of malicious code.

SUMMARY

One embodiment relates to a method of providing a computer security service via instant messaging. An instant message is received from an originating user account. The instant message is parsed to identify files and universal resource locators (URLs) in the instant message. If any files are identified, then said identified file(s) are scanned for malicious code to generate scan results. If any URLs are identified, then said identified URL(s) are checked against a ratings database to generate rating results. A responsive instant message to the originating user account is generated, wherein the responsive instant message includes said scan and rating results.

Another embodiment relates to an apparatus configured to provide a computer security service via instant messaging. A processor is configured to execute computer-readable instructions, and a memory is configured to store said computer-readable instructions and other computer-readable data. In addition, an input/output interface is configured for communicating data to devices outside the apparatus, and a system communicatively interconnects the processor, the memory and the input/output interface. An instant messaging application is included, the instant messaging application comprising computer-readable instructions for receiving an instant message from an originating user account. Furthermore, an instant messaging robot is included, the instant messaging robot comprising computer-readable instructions configured to (a) parse the instant message to identify files and universal resource locators (URLs) in the instant message, (b) initiate scanning of any said identified file(s) for malicious code to generate scan results, (c) initiate checking of any said identified URL(s) against a ratings database to generate ratings results, and (d) generate a responsive instant message to be sent by the instant messaging application to the originating user account, wherein the responsive instant message includes said scan and rating results.

Other embodiments, aspects and features are also disclosed.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Figure 1:
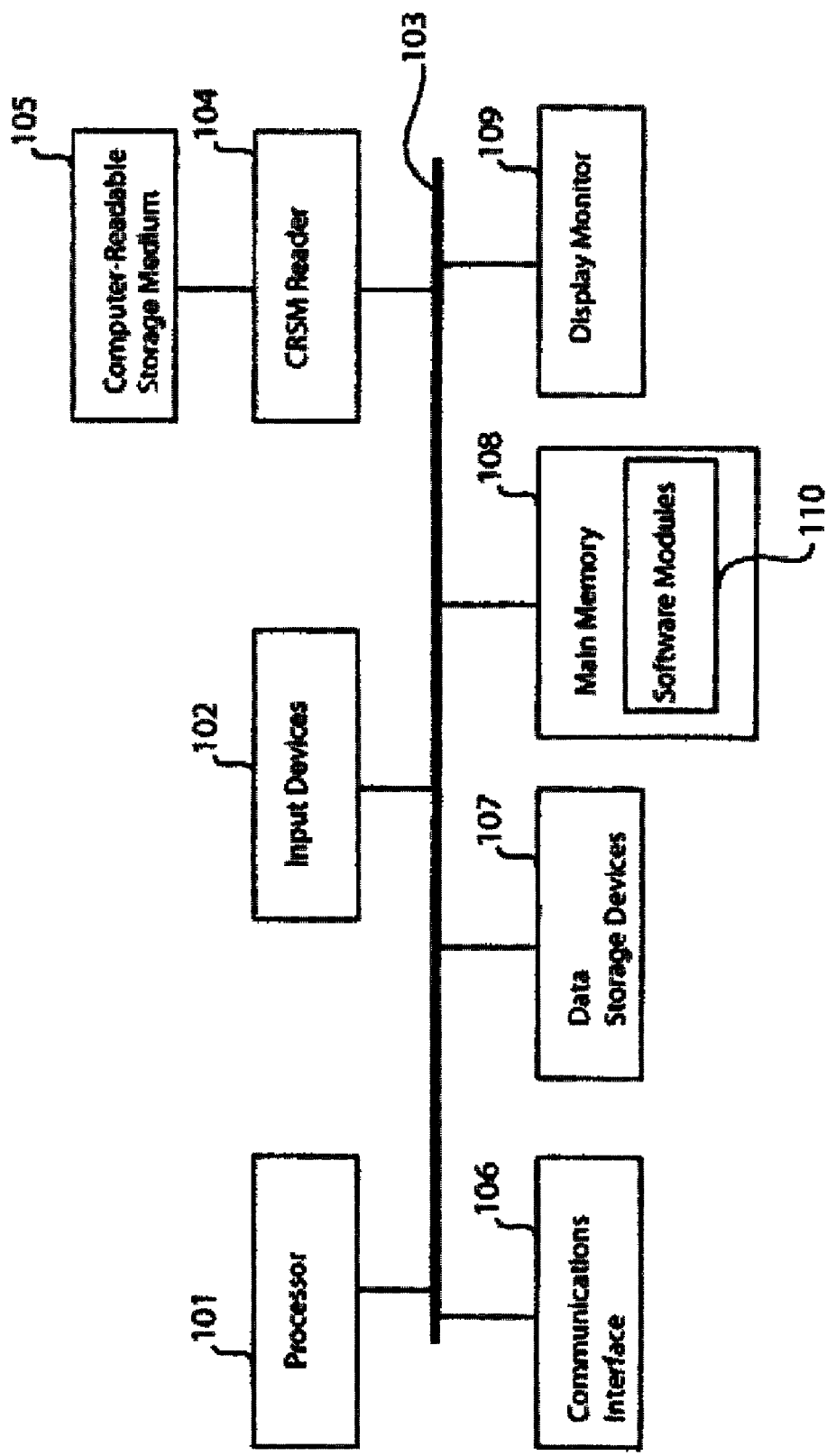
FIG. 1 shows a schematic diagram of an example computer that may be used in embodiments of the present invention.

Referring now to FIG. 1, there is shown a schematic diagram of an example computer that may be used in embodiments of the present invention. Depending on its configuration, the computer shown in the example of FIG. 1 may be employed as a client computer or a server computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. Software embodiments may also be received over a computer network by way of communications interface 106. In the example of FIG. 1, main memory 108 includes software modules 110, which may comprise software components of later described support server computers and customer client computers. The software modules 110 may be executed by processor 101.

Figure 2:
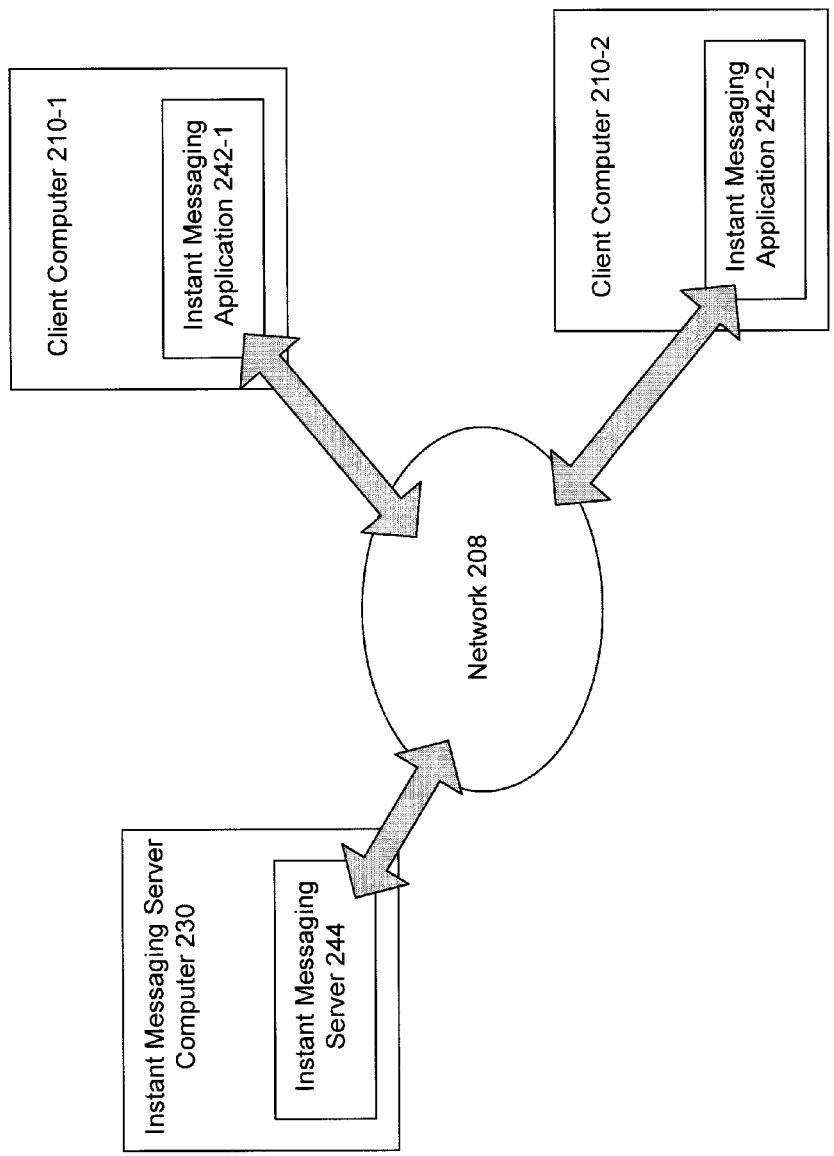
FIG. 2 schematically shows a conventional instant messaging system.

FIG. 2 schematically shows a conventional instant messaging system. Generally speaking, instant messaging is a form of electronic communication that involves immediate correspondence between two or more users who are all online simultaneously.

The conventional instant messaging system includes a plurality of client computers 210. (For example, 210-1 and 210-2 are depicted.) In addition, the system includes an instant messaging server computer 230, and a network 208 which is configured to allow the various computers to communicate with each other. The network 208 may comprise, for example, a public computer network, such as the Internet.

Each client computer 210 may include an instant messaging (client) application 242. (For example, 242-1 and 242-2 are depicted in client computers 210-1 and 210-2, respectively.) The instant messaging server computer 230 may include an instant messaging server 244. The instant messaging application 242 and the instant messaging server 244 may comprise computer-readable program code which work cooperatively with each other for sending and receiving instant messages over the computer network 208.

More particularly, each instant messaging application 242 may create a communication connection with the instant messaging server 244. For example, the connection may be a transmission control protocol (TCP) connection. Instant message protocol packets (such as logon packets, status packets, buddy list packets, and message packets) may then be exchanged over the connection between the instant messaging application 242 and the instant messaging server 244.

One aspect of instant messaging (IM) is that messages are "pushed" to the IM applications 242. For example, a first user (logged onto a first IM application 242-1) may send an instant message to a second user (logged onto a second IM application 242-2) who is a "buddy" of the first user. That instant message is first sent from the first IM application 242-1 to the IM server 244, and then automatically delivered (pushed) from the IM server 244 to the second IM application 242-2.

Figure 3:
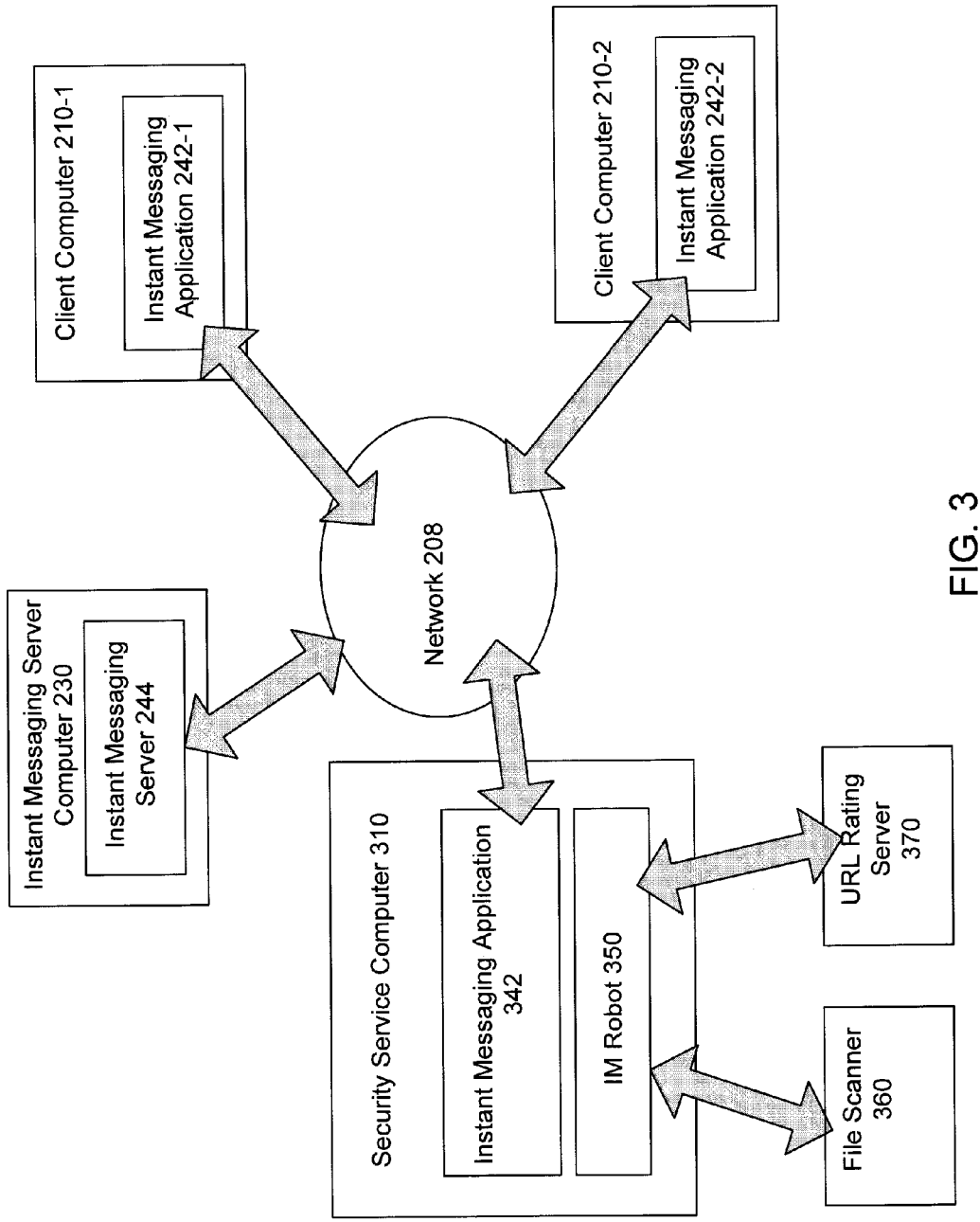
FIG. 3 schematically shows an apparatus configured to provide a computer security service via instant messaging in accordance with an embodiment of the invention.

FIG. 3 schematically shows an apparatus configured to provide a computer security service via instant messaging in accordance with an embodiment of the invention. In addition to the apparatus shown in FIG. 2, a security service computer 310 is provided and coupled to the network 208.

The security service computer 310 includes an instant messaging (client) application 342. This IM application 342 may be, for example, a copy of the IM application 242 discussed above. The IM application 342 may create a communication connection with the IM server 244, and may exchange IM protocol packets over the connection with the IM server 244.

Furthermore, the security service computer 310 includes an IM robot 350 coupled to the IM application 342. The IM robot 350 may comprise an instant messaging "robot" and may be implemented as computer-readable program code which is executable on the security service computer 310. The IM robot 350 may be configured to utilize the IM application 342 to send and receive instant messages to and from other IM applications 242 via the IM server 244.

The IM robot 350 may log into the instant messaging network by using a special user account on the IM application 342. In accordance with an embodiment of the invention, the special user account may be associated with a computer security service. For example, the special user account may be named "TREND MICRO"™ or another name indicative of the service provided.

The IM robot 350 may be further configured to parse the content of received instant messages. In parsing the message content, the IM robot 350 determines whether or not the message includes any computer-readable files and determines whether or not the message includes any universal resource locators (URLs).

If a computer-readable file is included in the message, then the IM robot 350 may send (dispatch) the file to a file scanner 360. The file scanner 360 is configured to scan the file to detect malicious code therein and to return scan results to the IM robot 350. For example, the file scanner 350 may comprise web threat protection software which is commercially available from Trend Micro Incorporated.

If a URL is included in the message, then the IM robot 350 may send (dispatch) the URL to a Rating Server 370. The Rating Server is configured to compare the URL with its database of URL ratings so as to determine if the URL links to a dangerous Internet resource. The ratings result may then be returned to the IM robot 350. For example, the Rating Server 370 may comprise an antivirus scanning engine which is commercially available from Trend Micro Incorporated.

After receiving the scan and/or ratings results, the IM robot 350 may return an appropriate instant message back to the originating user account. The returned message may indicate whether the file(s) sent is (are) clean or infected by malicious code. The returned message may also indicate whether the URL(s) sent is (are) safe or a security risk.

Figure 4:
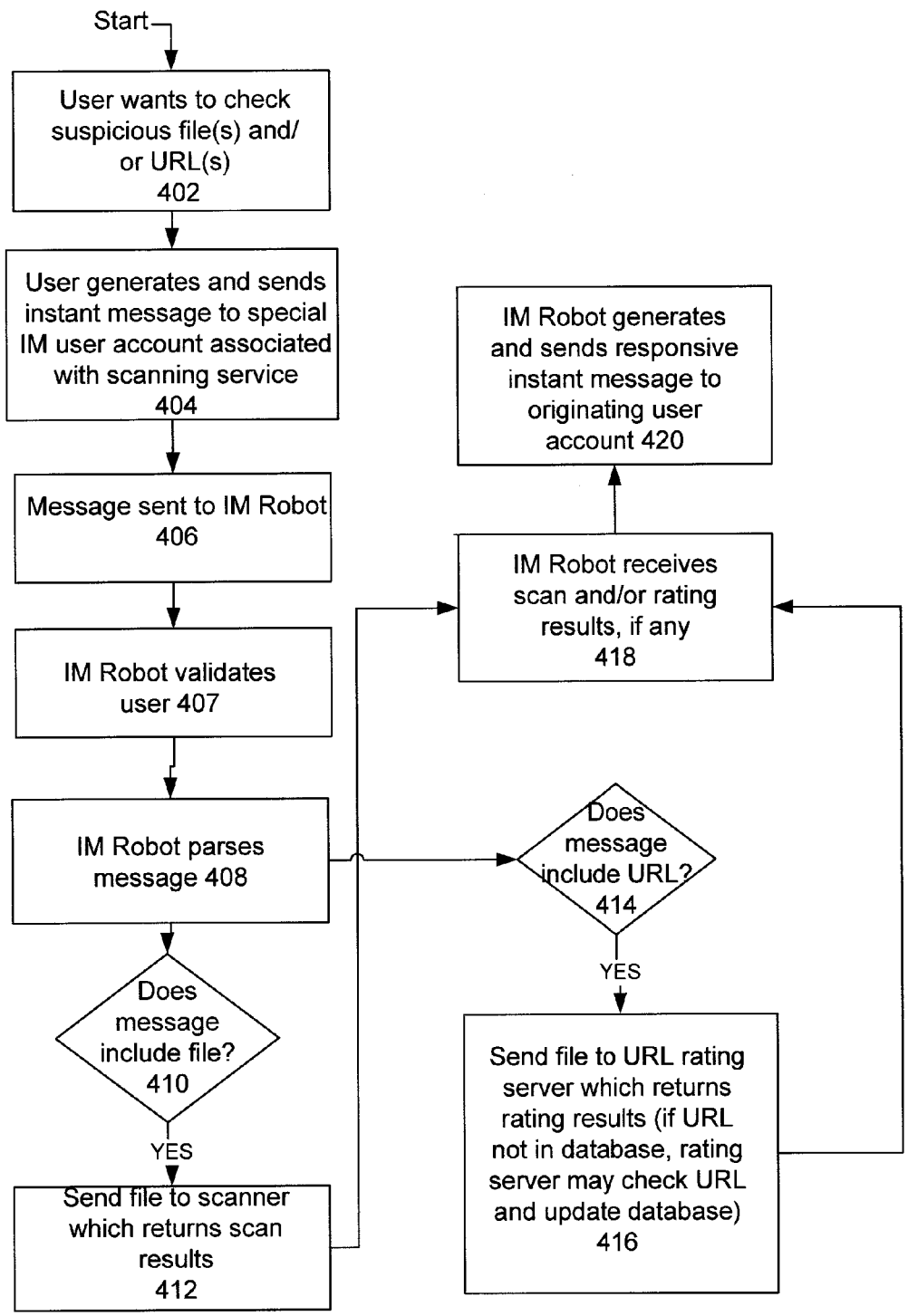
FIG. 4 is a flow chart depicting a method for providing a computer security service via instant messaging in accordance with an embodiment of the invention.
Figure 5A:
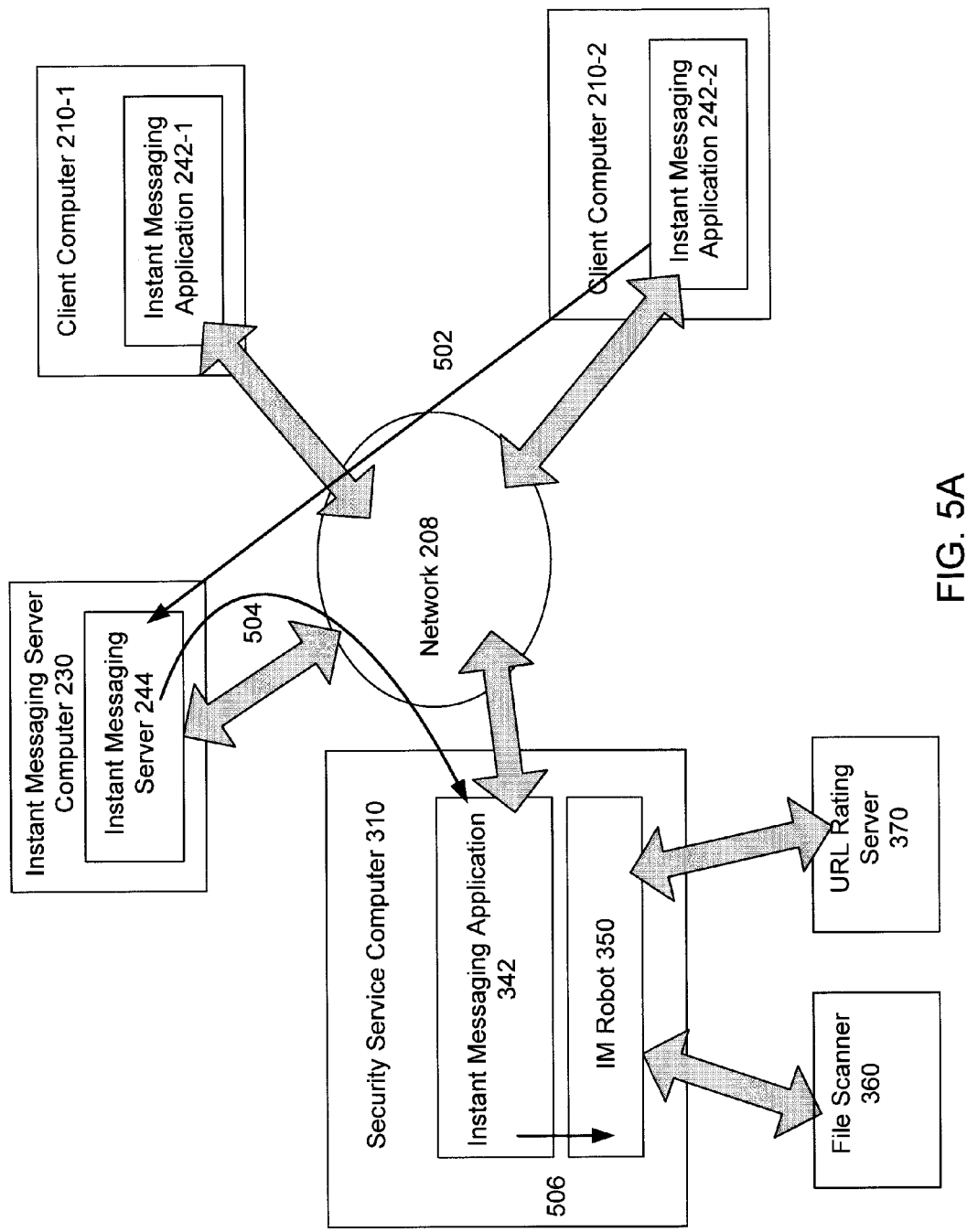
FIG. 5A depicts steps for communicating the instant message from an IM application on a client computer to a special user account logged onto an IM application on a security service computer and further communication of the instant message to an IM robot in accordance with an embodiment of the invention.
Figure 5B:
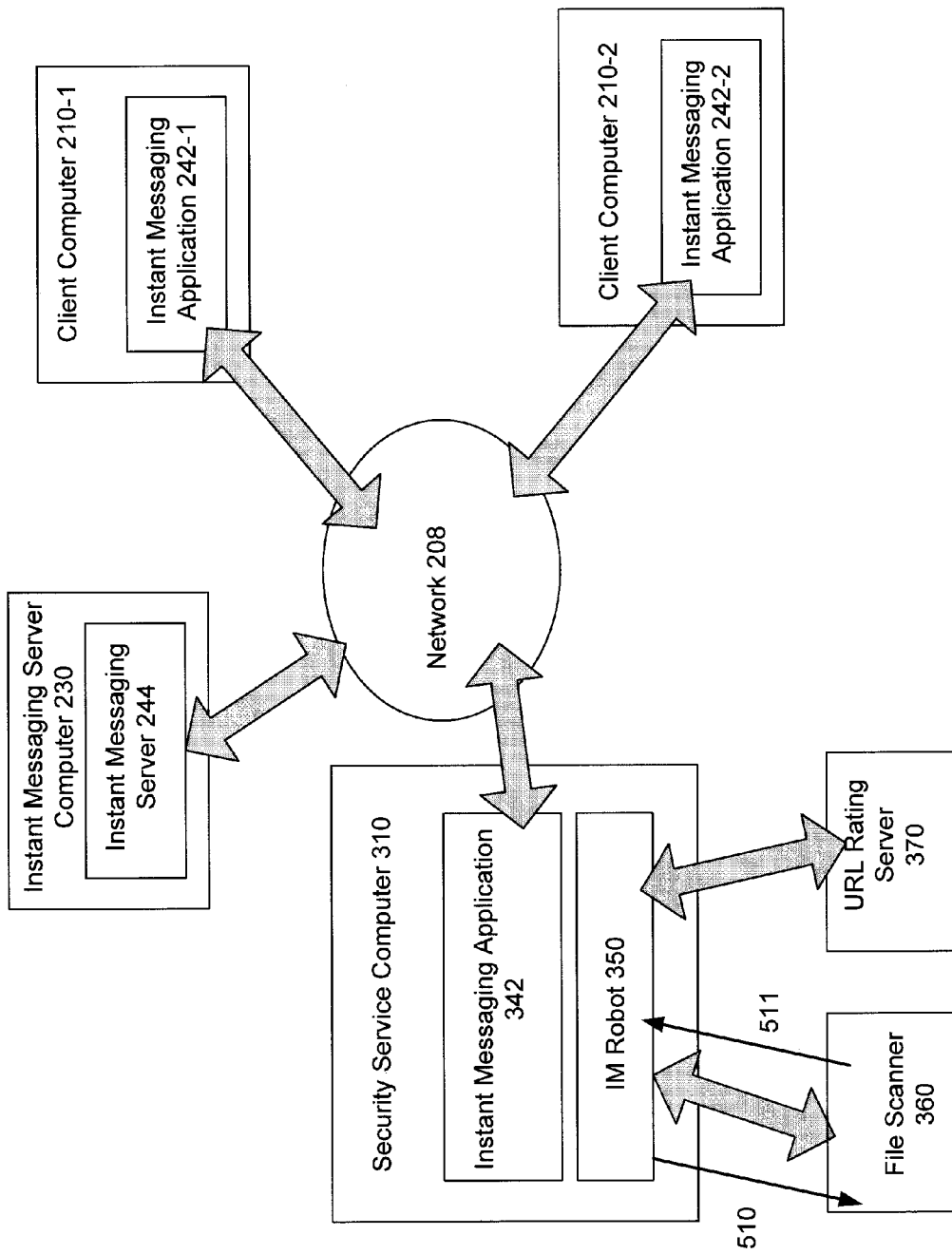
FIG. 5B depicts steps for dispatching a file extracted from the instant message to a file scanner and receiving scan results in accordance with an embodiment of the invention.
Figure 5C:
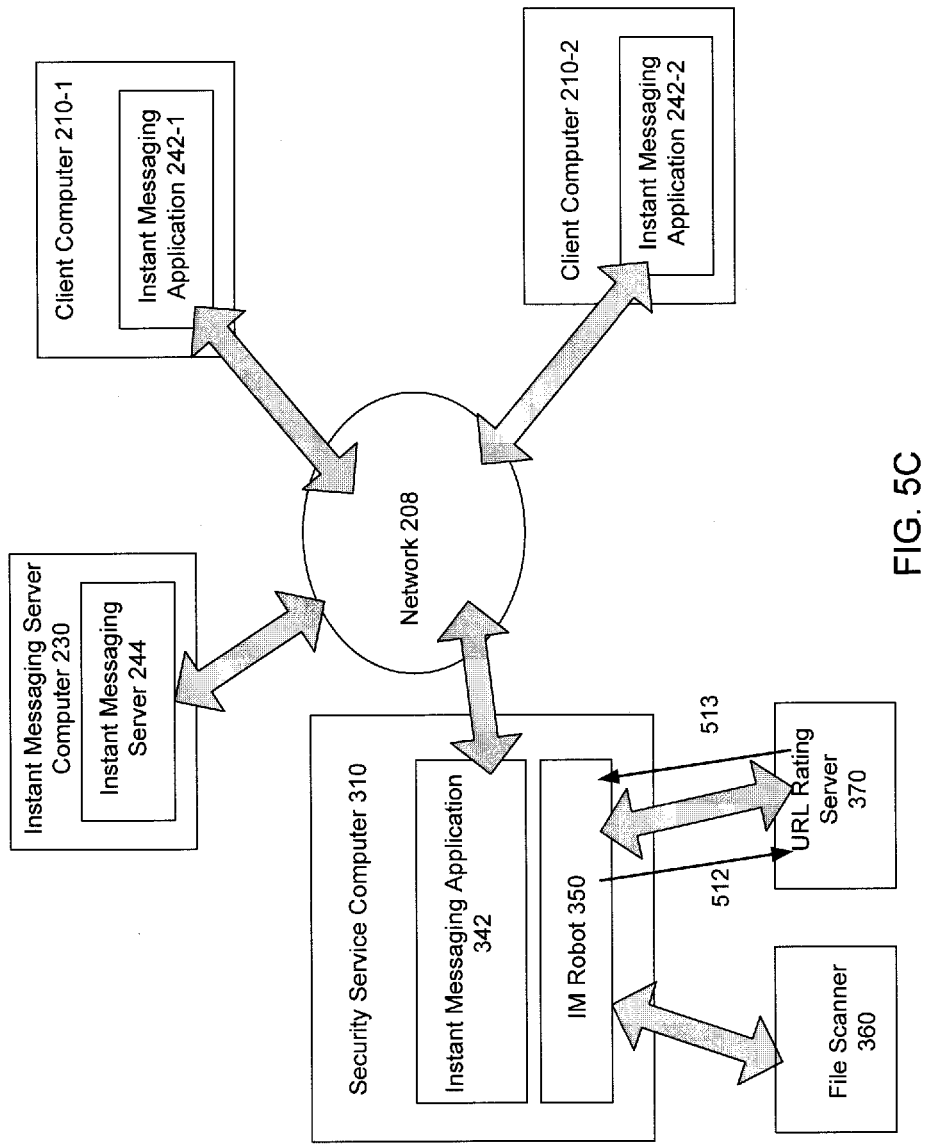
FIG. 5C depicts steps for dispatching a universal resource locator (URL) extracted from the instant message to a URL rating server and receiving the rating results in accordance with an embodiment of the invention.
Figure 5D:
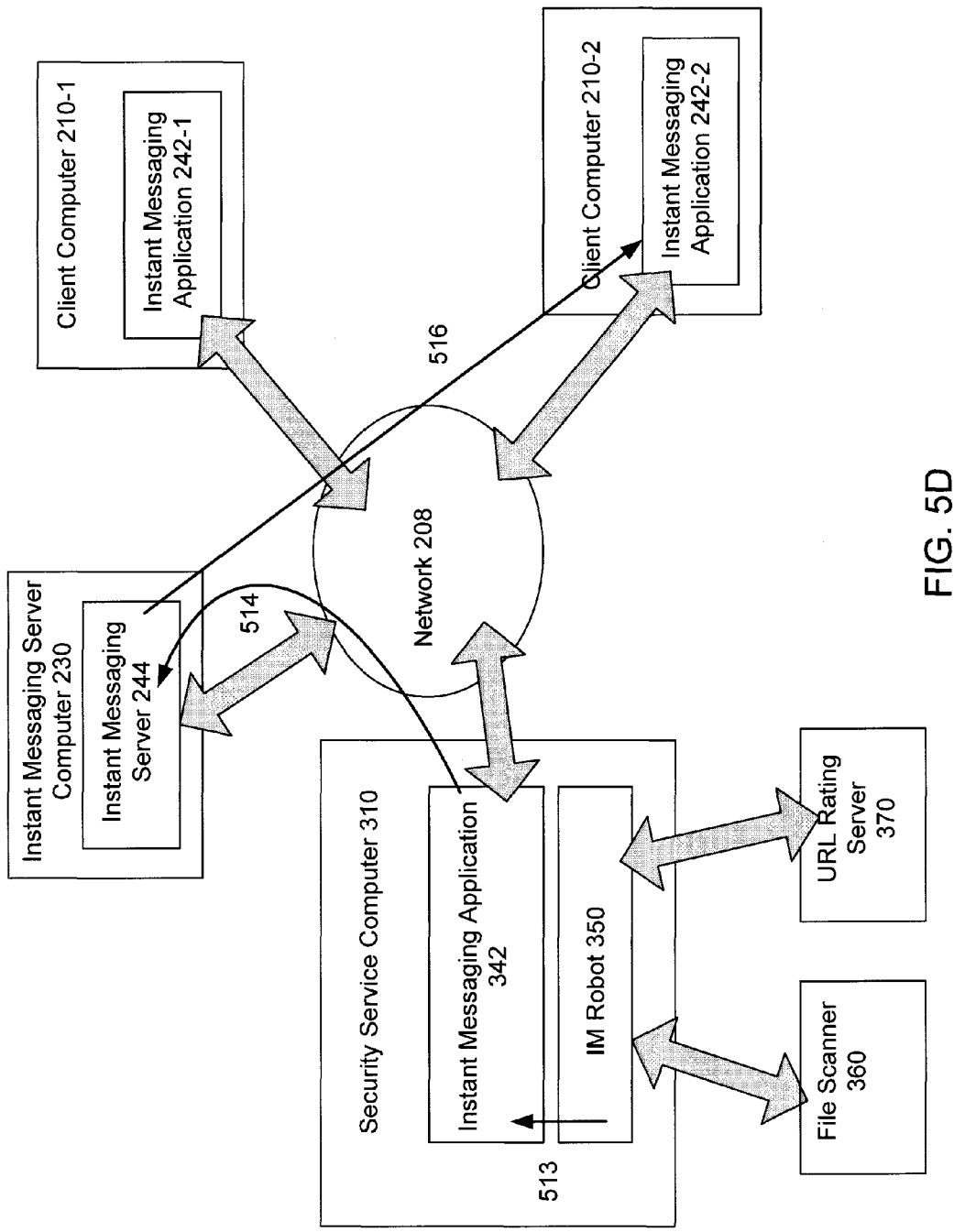
FIG. 5D depicts steps for communicating the scan and/or rating results from the IM robot to the IM application on the security service computer and further communication of a responsive instant message including the to the originating IM application in accordance with an embodiment of the invention.
Figure 6:
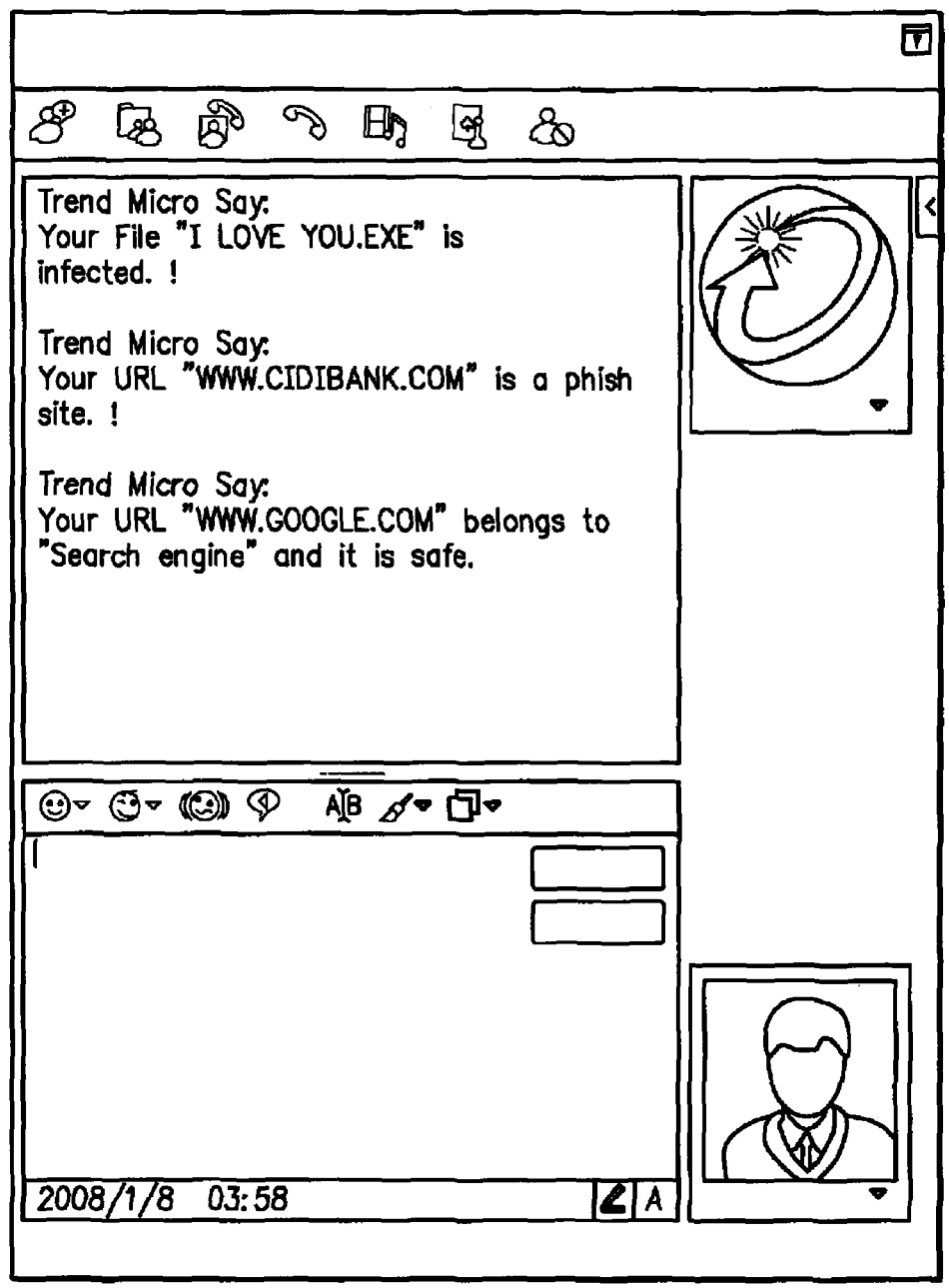
FIG. 6 depicts an example instant message providing computer security results in accordance with an embodiment of the invention.

FIG. 4 is a flow chart depicting a method for providing a computer security service via instant messaging in accordance with an embodiment of the invention. FIGS. 5A through 5D schematically depict various steps in the method, and FIG. 6 depicts an example instant message providing computer security results in accordance with an embodiment of the invention.

As seen in FIG. 4, in the first step 402, a user at a client computer may want to check suspicious files and/or URLs to determine whether the files and/or URLs pose a security risk. Regarding files, for example, a user may receive an uncertain file from electronic mail, or downloads suspicious files from a web site or via FTP. Regarding URLs, for example, a user may want to perform some transaction with or download files from an uncertain web site.

The user then generates and sends 404, via an instant messaging network, an instant message including the suspicious file(s) and/or URL(s) to a special instant messaging user account. The special IM user account may be associated with the scanning service and may have been previously added by the user to his/her contact or "buddy" list. The step 404 is schematically depicted in FIG. 5A. FIG. 5A illustrates the instant message containing the suspicious file(s) and/or URL(s) being communicated 502 from an IM Application 242 to the IM Server 244 on the IM server computer 230, and then the message being communicated 504 from the IM Server 244 to an IM Application 342 on the security service computer 310.

If a next step 407, the IM Robot 350 may validate the user which forwarded the instant message for scanning. In other words, the IM Robot 350 may validate the user account that originated the message to be scanned. For example, a valid user account may have a subscription with an IM message scanning service. If the user account is invalid, then the method may stop and may return an instant message indicating that a subscription is needed for this service. If the user account is validated, then the method may go forward to the fifth step 408.

In a next step 408, the IM Robot parses the content of the instant message. In particular, the IM Robot 350 determines whether or not the message includes any computer-readable files and determines whether or not the message includes any universal resource locators (URLs). If the IM Robot 350 determines 410 that a computer-readable file is present in the message, then the file is sent to the file scanner which returns scan results (412). This is illustrated in FIG. 5B which shows the IM robot 350 dispatching 510 the file to a file scanner 360 and which also shows the file scanner 360 (after scanning the file to detect malicious code therein) returning 511 scan results to the IM robot 350. If the IM Robot 350 determines 414 that a URL is present in the message, then the IM Robot 350 may send (dispatch) the URL to the Rating Server which returns rating results (416). This is illustrated in FIG. 5C which shows the IM robot 350 dispatching 512 the URL to the Rating Server 370 and which also shows the Rating Server 370 (after determining if the URL links to a suspect or dangerous Internet resource) returning 513 the rating results to the IM robot 350.

Once the IM Robot receives 418 all the expected scan and/or rating results back from the file scanner and the rating server, then the IM Robot may generate and send 420 an instant message including the scan/rating results to the originating user account. This step 420 is schematically depicted in FIG. 5D. FIG. 5D shows the IM Robot 350 causing 513 the third IM Application 342 to send the instant message with the results. FIG. 5D also shows the instant message with the results being communicated 514 from the third IM Application 342 to the IM Server 244, and then the message being communicated 516 from the IM Server 244 to the originating IM Application 242-2. In one embodiment, the instant message with the results may be sent no matter whether the result is positive or negative.

An example instant message including the scan/rating results is shown in an illustrative screen shot provided in FIG. 6. In this example, the user account for the security service is named "Trend Micro"™. The top portion of the example message states that a file, here named "I LOVE YOU.EXE" is infected. The next portion of the example message states that a URL, here named "WVVW.CIDIBANK.COM" is a phish site. The next portion of the example message states that a URL, here named "WWW.GOOGLE.COM" belongs to a search engine and is a safe URL.

Advantageously, the above-discussed method and apparatus provides a particularly accessible service which may be used by instant messaging users to scan suspicious files and URLs. Users may simply send the file(s) and/or URL(s) to be scanned to a particular user account associated with the security service.

There are many times users may get a suspicious file or URL on internet without knowledge about it is a malicious file/URL or not. The above-discussed solution provides a special IM account which a user may add to a contact or "buddy" list so as to access a scanning/rating service. Accessing the service via instant messaging is particularly convenient because instant messaging is typically one of the most common applications in user's personal computer. Further, instant messaging is a portable service so that a user may utilize the service from different computers.

As discussed above, when a user wants to download suspicious file or perform some transaction on an uncertain web site, the user may readily send the URL to the special IM account. Furthermore, if the user receives an uncertain file from E-mail, or download suspicious files from web site, FTP, etc, the user may send the file to special IM account. The security service computer with the special IM account then uses a "robot" to parse the instant messages. If a URL string is present, then the robot may query the URL Rating Server to check whether the URL is malicious (phishing, hacker . . . ) or not. If a file is present, then the robot may pass the file to a backend scan engine, and start an antivirus scan process.

A feature may be included, in a preferred embodiment, where if the URL is not in the database of the URL Rating Server, then the URL Rating Server may download or access the unknown URL and check it for any malicious threats. The database may then be updated with the result of this checking and the response to the originating user may include this updated information. This feature is indicated in block 416 of FIG. 4.

Figure 7:
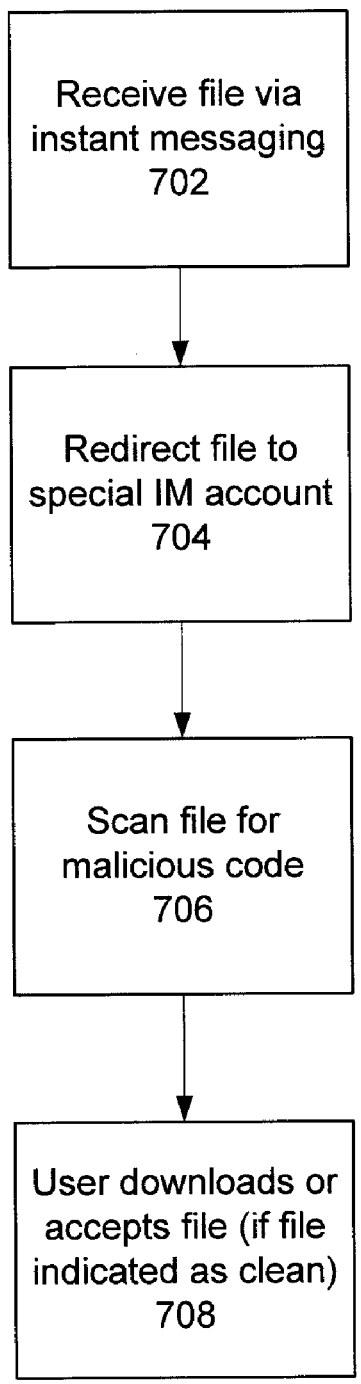
FIG. 7 is a flow chart illustrating a redirection mechanism in accordance with an embodiment of the invention.

Another feature that may be included, in a preferred embodiment, is to include a redirection mechanism. This feature is illustrated in FIG. 7. When a user receives 702 a file via instant messaging, the redirection mechanism allows the user to redirect 704 the file to the special IM account for scanning 706 prior to the user actually downloading or accepting the file (if the file is indicated as clean) 708.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of providing a computer security service via instant messaging, the method comprising:
   receiving, by a server computer, an instant message from an originating user account;
   parsing the instant message by the server computer to identify files and universal resource locators (URLs) in the instant message;
   if any files are identified, then scanning said identified file(s) for malicious code to generate scan results;
   if any URLs are identified, then checking said identified URL(s) against a ratings database to generate rating results;
   validating the originating user account and not sending the responsive instant message if the originating user account is found to be invalid; and
   generating, by the server computer, a responsive instant message to the originating user account if the originating user account is found to be valid, wherein the responsive instant message includes said scan and rating results.

2. The method of claim 1, further comprising:
   if an identified URL is unknown in the ratings database, then accessing the unknown URL, checking the unknown URL for malicious threats, and updating the ratings database with results of said checking.

3. An apparatus configured to provide a computer security service via instant messaging, the apparatus comprising:

a processor configured to execute computer-readable instructions;

memory configured to store said computer-readable instructions and other computer-readable data;

an input/output interface for communicating data to devices outside the apparatus;

a system which communicatively interconnects the processor, the memory and the input/output interface;

an instant messaging application comprising computer-readable instructions for receiving an instant message from an originating user account;

an instant messaging robot comprising computer-readable instructions configured to parse the instant message to identify files and universal resource locators (URLs) in the instant message, initiate scanning of any said identified file(s) for malicious code to generate scan results, initiate checking of any said identified URL(s) against a ratings database to generate ratings results, validate the originating user account and not sending the responsive instant message if the originating user account is found to be invalid, and generate a responsive instant message to be sent by the instant messaging application to the originating user account if the originating user account is found to be valid, wherein the responsive instant message includes said scan and rating results.

4. The apparatus of claim 3, further comprising a file scanner configured to perform said scanning for malicious code.

5. The apparatus of claim 3, further comprising a ratings server configured to perform said checking against the ratings database.

6. The apparatus of claim 5, wherein the ratings server is further configured such that, if an identified URL is unknown in the ratings database, then the unknown URL is accessed and checked for malicious threats, and the ratings database is updated with results of said checking.

* * * * *